June 26, 1928.  E. F. VON LUETTWITZ  1,674,751
EQUALIZED BRAKING MECHANISM FOR SINGLE TRACK VEHICLES
Filed June 17, 1925
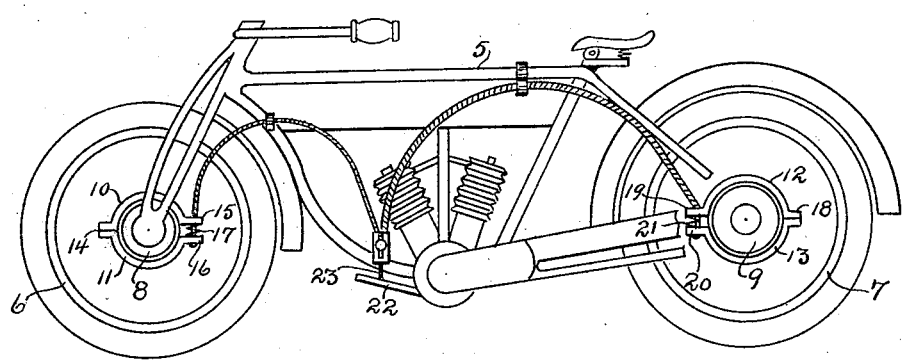
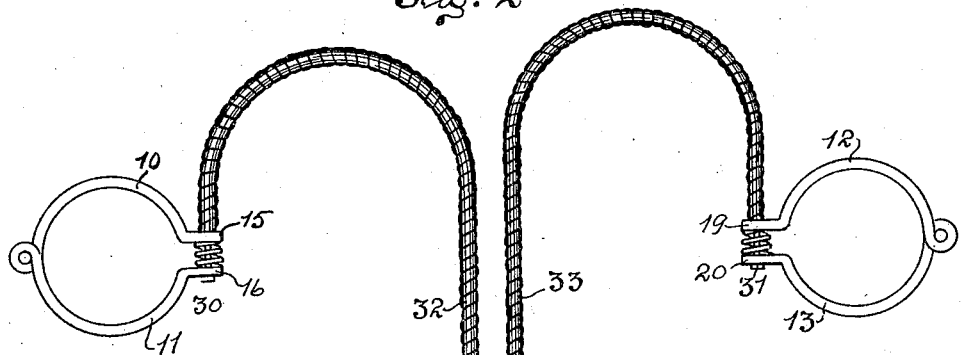
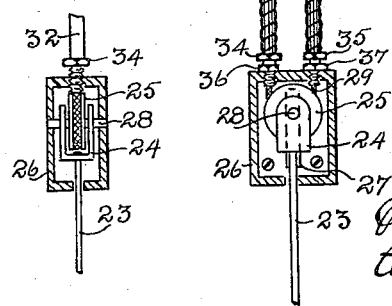
INVENTOR
BY
ATTORNEY Patented June 26, 1928.

1,674,751

UNITED STATES PATENT OFFICE.

ERNST FREIHERR von LUETTWITZ, OF BRAUCHITSCHDORF, GERMANY.

EQUALIZED BRAKING MECHANISM FOR SINGLE-TRACK VEHICLES.

Application filed June 17, 1925. Serial No. 37,648.

The device, the subject of this invention is a braking mechanism for vehicles having their wheels in alignment and the vehicles particularly referred to are motorcycles and vehicles of that general class.

The object of the invention is to provide a braking means simple in construction and operation and yet of extreme efficiency and the particular object is to provide means for braking or checking the movement of all wheels.

In describing and illustrating my invention, I will describe it in connection with a motorcycle, as such is the more common type of single track vehicles.

The accompanying drawing should be referred to for a complete understanding of the specification which follows.

In the drawing:—

Fig. 1, shows in side elevation, though in a somewhat incomplete form, a motorcycle, my braking mechanism being attached thereto.

Fig. 2, is an enlarged view of my device, and

Fig. 3, a side elevation of a part removed, this view being taken at right angles to the view in Fig. 2.

Similar reference numerals indicate like parts in all the figures where they appear.

As in the attachment and operation of my device, no particular change is required in the construction of the vehicle, I will indicate the motorcycle frame as a whole, with the reference character 5 and the wheels with the characters 6 and 7, the front wheel being indicated at 6 and the back wheel at 7. Each of the wheels is provided with a brake drum as shown at 8 and 9 and surrounding each drum is a brake band in two parts, the brake band upon the front wheel brake drum being indicated at 10 and 11 and the brake band upon the rear wheel brake drum at 12 and 13.

The portions 10 and 11 of the front brake drum are hinged at 14 and the projections and lugs 15 and 16 are normally separated and retained away from each other by a spring 17. The sections 12 and 13 of the rear brake band are hinged at 18 and their projecting lugs 19 and 20 are normally retained apart by a spring 21.

At 22 I show a pedal which is arranged on or adjacent to the running board or foot rest and secured to this pedal is a short link or cable 23, the inner end of which is secured to a movable block 24, wherein is supported a rotatable sheave 25. The block 24 is movable in a box or casing 26 and each side member of the box or casing 26 is provided with a slot or way 27 into which the shaft 28 is free to move.

A continuous, flexible wire cable 29 extends around the sheave 25, one end of this cable being secured at 30 to the lug 16 of the lowermost member 11 of the brake band surrounding the front brake drum 8 and the other end of the flexible member is secured at 31 to the lug 20 of the lowermost brake band member 13 surrounding the brake drum on the rear wheel.

Surrounding and covering each of the extended portions of the cable 29 is a spiral metallic sheath 32—33. This sheath is in two parts. One end of the part 32 rests upon the lug 15 of the upper member 10 of the front wheel brake band and one end of the sheath member 33 rests upon the lug 19 of the upper member 12 of the rear brake band. The adjacent ends of both of the spiral members are received on adjusting screws, such screws being shown at 34 and 35. Each of these screws is adjustably retained in the casing 26 and each is provided with a longitudinal perforation through which the cable 29 extends. Suitable lock nuts 36 and 37 retain the screws in their adjusted position and when arranged as described, the box member 26 and parts associated therewith becomes a highly efficient compensating or equalizing member for the brake operating cables.

The operation of this device can probably be well understood from the description of its construction.

When the foot pedal 22 is depressed, the block 24 and sheave 25 are moved downward, drawing both ends of the cable 29 equally, the spiral member exerting the opposed pressure. The draw on the cable 29 will cause the lugs 15 and 16 and 19 and 20 to approach each other, closing their respective brake bands upon their associated brake drums.

It will be noted that the brake bands on the front and rear wheels, as shown, are of different diameters. The object of this is to provide an equal braking on both wheels. The greatest weight and greatest tractive effort being found in the rear wheel of a motorcycle, I have found it expedient to provide a more powerful brake for this wheel. The ratio of braking effort between the wheels will be determined by particular conditions, construction of the vehicle, or the service. The object is, obviously, to obtain uniform braking effort so as to avoid skidding, so-called bucking or the tendency of the front or rear wheels to leave the ground, due to the fact that the rotation of the opposite wheel is suddenly checked.

What I claim and desire to secure is:—

A braking mechanism for two wheel vehicles comprising a plurality of brake bands, one upon each wheel, each brake band being formed in two parts hinged together, a continuous flexible cable between said bands and adapted to draw one part of each band toward the other part of its band, a flexible non-compressible casing for said cable and in contact with the other side of said brake band and an equalizing means having a sheave over which said cable is free to pass and a casing for said sheave and means for moving said sheave in said casing.

Signed at the city, county and State of New York, this 8th day of June, 1925.

ERNST FREIHERR von LUETTWITZ.